United States Patent
Arita

(10) Patent No.: US 10,222,542 B2
(45) Date of Patent: Mar. 5, 2019

(54) BACKLIGHT AND DISPLAY

(71) Applicant: Mitsubishi Electric Corporation, Tokyo (JP)

(72) Inventor: Kenji Arita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/839,950

(22) Filed: Dec. 13, 2017

(65) Prior Publication Data

US 2018/0172901 A1 Jun. 21, 2018

(30) Foreign Application Priority Data

Dec. 19, 2016 (JP) ................. 2016-245338

(51) Int. Cl.
*F21V 8/00* (2006.01)

(52) U.S. Cl.
CPC ........... *G02B 6/0088* (2013.01); *G02B 6/009* (2013.01); *G02B 6/0051* (2013.01); *G02B 6/0055* (2013.01); *G02B 6/0085* (2013.01)

(58) Field of Classification Search
CPC .................................................. G02B 6/0088
USPC ....................... 361/606; 349/60, 65; 362/606
See application file for complete search history.

(56) References Cited

U.S. PATENT DOCUMENTS

| 5,808,707 | A | * | 9/1998 | Niibori et al. | ........ G02F 1/1333 |
| 7,600,910 | B2 | | 10/2009 | Sakai | |
| 8,913,207 | B2 | | 12/2014 | Watanabe | |
| 2002/0080319 | A1 | * | 6/2002 | Hagiwara | .............. G02F 1/1339 |
| 2002/0113919 | A1 | * | 8/2002 | Lie et al. | .............. G02F 1/1335 |
| 2008/0030652 | A1 | * | 2/2008 | Zhuang et al. | ........ G02F 1/1335 |

FOREIGN PATENT DOCUMENTS

| JP | 2008-016433 A | 1/2008 |
| JP | 2012-014893 A | 1/2012 |

* cited by examiner

*Primary Examiner* — Allyson Trail
(74) *Attorney, Agent, or Firm* — Studebaker & Brackett PC

(57) ABSTRACT

The object of the present invention is to prevent deformation in a light guide plate and display anomalies. When the light guide plate is disposed in the backlight, a cushion rubber abuts a side surface of the light guide plate and a side surface portion of a lower frame to be pressed (squeezed) into the light guide plate and the lower frame. The cushion rubber is disposed lower than the side surface of the light guide plate, and is formed at a height not interfering with optical sheets. A protrusion portion is formed from an upper surface portion of an upper frame in a space between an upper surface portion of the cushion rubber and the upper frame to face the upper surface portion of the cushion rubber.

10 Claims, 6 Drawing Sheets

BACKLIGHT AND DISPLAY

BACKGROUND OF THE INVENTION

Field of the Invention

The present invention relates to a backlight and a display including the backlight.

Description of the Background Art

Displays each include a display panel that displays an image, and a backlight that illuminates the display panel. The backlight includes a light source, a light guide plate that guides light emitted from the light source toward the display panel, optical sheets that control the light from the light guide plate, and frames holding these components. The light emitted from the light source is converted into surface light by the light guide plate, and is guided toward the display panel.

The backlight has a clearance between the light guide plate and each of the frames to absorb the movement subject to vibrations in a use environment or subject to expansion and contraction of the light guide plate caused by temperature variation. However, this clearance results in (i) rattle noise caused by the movement of the light guide plate in the frames and rattling of the light guide plate and the surrounding components when the vibrations or shocks are given or (ii) display anomalies caused by deviations in the optical components.

To restrain the movement of the light guide plate in the backlight, Japanese Patent Application Laid-Open No. 2008-16433 or No. 2012-14893 discloses a structure of compressively fixing the light guide plate using an elastic component.

In these Japanese Patent Applications, the elastic component subject to the vibrations or the temperature variation in the use environment presses the light guide plate with the application of compressive stress, which may result in deformation of the light guide plate and display anomalies. Moreover, the moving light guide plate interferes with the other components such as the optical sheets, which may also result in display anomalies.

SUMMARY

The object of the present invention is to prevent deformation in a light guide plate of a backlight and display anomalies that are caused by pressing the light guide plate with the application of compressive stress to an elastic component subject to vibrations or temperature variation in a use environment and also to reduce display anomalies caused by interference of the elastic component with the other components through movement of the elastic component.

Each of a backlight and a display according to the present invention includes a light source, a light guide plate, an optical sheet, a lower frame, an upper frame, and an elastic component. The light guide plate has a side surface connecting a light emitting surface to an opposite light emitting surface opposite to the light emitting surface, the light guide plate emitting, from the light emitting surface, light from the light source. The optical sheet is arranged on the light emitting surface of the light guide plate. The lower frame has a bottom surface part and a side surface part continuous from the bottom surface part, the lower frame holding the light source and the light guide plate inside. The upper frame has an upper surface part facing the light emitting surface of the light guide plate, and a side surface part continuous from the upper surface part, the upper frame being engaged in the lower frame. The elastic component is disposed between the side surface of the light guide plate and the side surface portion of the lower frame or the upper frame. The elastic component is disposed lower than the optical sheet in a cross-sectional view. A protrusion portion is formed in a space between the upper surface portion of the upper frame and the elastic component, the protrusion portion protruding from the upper frame toward a direction in which the elastic component is disposed.

The backlight and the display according to the present invention prevent deformation in the light guide plate and display anomalies that are caused by pressing the light guide plate with the application of compressive stress to an elastic component subject to vibrations or temperature variation in a use environment, and also reduce display anomalies caused by interference of the elastic component with the other components through movement of the elastic component.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
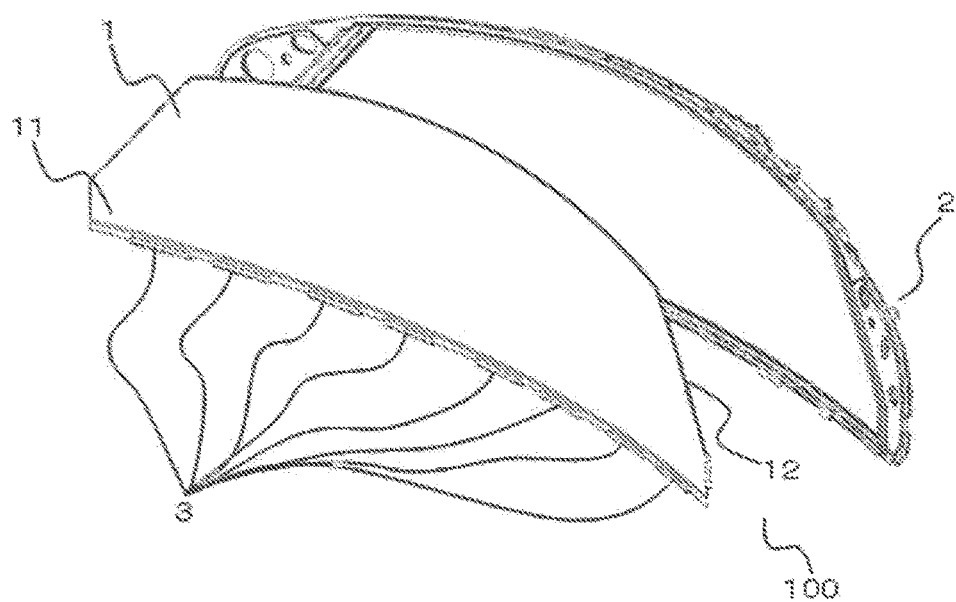
FIG. 1 is an exploded perspective view of a display according to the present invention.

Embodiments of a display according to the present invention will be described with reference to the drawings. The constituent components with the same reference numerals will denote the same or substantially the same components in the following description. Thus, the detailed description thereof may be omitted. For example, the dimension, material, shape, and location of each of the constituent components in Embodiments are not necessarily limited but are subject to change as necessary according to a structure of an apparatus to which the present invention is applied or various conditions.

Embodiment 1

Figure 2:
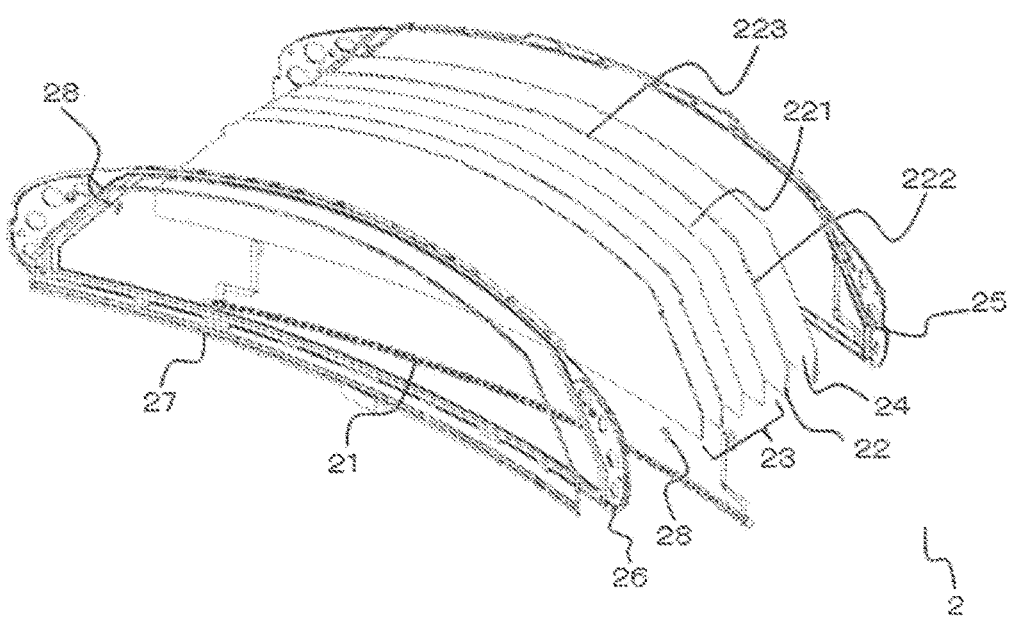
FIG. 2 is an exploded perspective view of a backlight included in the display according to the present invention.

FIG. 1 is an exploded perspective view illustrating a schematic structure of a display according to the present invention. FIG. 2 is an exploded perspective view of a backlight included in the display according to the present invention.

Display

In FIG. 1 or 2, a display 100 according to the present invention includes a display panel 1 that displays an image, a backlight 2 that illuminates an opposite display surface 12 that is opposite to a display surface 11 of the display panel 1, and wiring boards 3 each for inputting a control signal to the display panel 1. The display panel 1 is, for example, a liquid-crystal display panel. The liquid-crystal display panel applies birefringence of liquid crystals, and includes (i) a first substrate obtained by forming, for example, a color layer, a light shield layer, and a counter electrode on an insulating substrate made of glass, etc., and (ii) a second substrate obtained by forming, for example, a thin film transistor functioning as a switching element and a pixel electrode on an insulating substrate made of glass, etc. The liquid-crystal display panel further includes a spacer for maintaining the spacing between the first substrate and the second substrate, a sealant for sealing the first substrate to the second substrate, liquid crystals sandwiched between the first substrate and the second substrate, a sealing material for sealing an injection hole for injecting the liquid crystals, and an alignment layer and a polarizer for aligning the liquid crystals. A display area of the display panel 1 consists of many pixels. The wiring boards 3 apply signals corresponding to display images to the respective pixels to display an image.

Backlight

As illustrated in FIG. 2, the backlight 2 includes a light source 21 that emits light, a light guide plate 22 that propagates the light emitted from the light source 21, optical sheets 23 arranged on a light emitting surface 221 of the light guide plate 22, and a light reflection sheet 24 disposed closer to an opposite light emitting surface 222 of the light guide plate 22. The backlight 2 further includes a lower frame 25 that holds these components inside, and an upper frame 26 that is engaged in the lower frame 25. The backlight 2 includes a cushioning 27 disposed on the upper frame 26 for protecting and holding the opposite display surface 12 of the display panel 1. The backlight 2 further includes a housing that is not illustrated but holds the display panel 1 from the display surface 11 side and fixes the display panel 1 with the backlight 2.

Light Guide Plate

The light guide plate 22 propagates the light from the light source 21, and emits the light from the light emitting surface 221. The light reflection sheet 24 is disposed on the opposite light emitting surface 222 to block the light emitted from the opposite light emitting surface 222. The light source 21 is disposed on a side surface 223 that connects the light emitting surface 221 to the opposite light emitting surface 222 to receive the light. The light guide plate 22 may be a rectangle in a plan view, and have shapes other than the rectangle such as a polygon. The light guide plate 22 may be, for example, a flat plate with a constant thickness, or a wedge-shaped light guide plate. As illustrated in FIG. 1 or 2, the light guide plate 22 may be curved. The light guide plate 22 is made of a material such as a transparent acrylic resin, a polycarbonate resin, and glass. The light guide plate 22 has, on the opposite light emitting surface 222 side, a light scattering portion (not illustrated) that guides the light from the light emitting surface 221 of the light guide plate 22 in a light emitting direction against a light propagation direction. The light scattering portion functions as a means for reflecting the light toward an inner portion of the light guide plate 22. Examples of the light reflecting means include, on the opposite light emitting surface 222, a method of dot printing, a method of forming a grained surface by roughening the opposite light emitting surface 222, and a method of forming minute spheres or depressions and protrusions.

Optical Sheets

The optical sheets 23 can be arranged by combining, for example, lens sheets and diffusion sheets. The optical sheets 23 may have a structure obtained by sandwiching a lens sheet between diffusion sheets. The optical sheets 23 may also be a plurality of lens sheets obtained by optimally combining directions of prism to increase the brightness. Two or more diffusion sheets may be used to increase the diffusion thereof. The number of the diffusion sheets may be only one or zero. Protective sheets, viewing angle control sheets, and polarized reflection sheets may be used as the optical sheets 23. In other words, the optical sheets 23 are arranged in combination according to a desired brightness and light distribution characteristics.

Light Reflection Sheet

The light reflection sheet 24 is made of, for example, a material obtained by mixing barium sulfate or titanium oxide with polyethylene or polyethylene terephthalate, a material formed of a resin with minute bubbles, a material obtained by evaporating silver onto a metal plate, or a material obtained by applying a coating including titanium oxide to a metal plate. The reflectivity of the light reflection sheet 24 is preferably higher than or equal to 90% to reduce reflection loss on a reflection surface. The light reflection sheet 24 may be made of a material with specular reflection. Since disposition of the light reflection sheet 24 enables the light emitted from the light guide plate 22 to be directed toward the light guide plate 22 again and enter the light guide plate 22, the light utilization efficiency can be increased.

Light Source

The light source 21 includes point light sources that emit light, and a light source substrate on which the point light sources are mounted. The back surface of the light source substrate may include a holder made of a metal. The light source 21 may be fixed to the lower frame 25.

Lower Frame/Upper Frame

The lower frame 25 made of a metal such as aluminum or a material including a metal can increase heat dissipation of the light source 21, reduce the light loss, and increase the light utilization efficiency of the backlight 2. The upper frame 26 is made of a resin or a metal.

Figure 3:
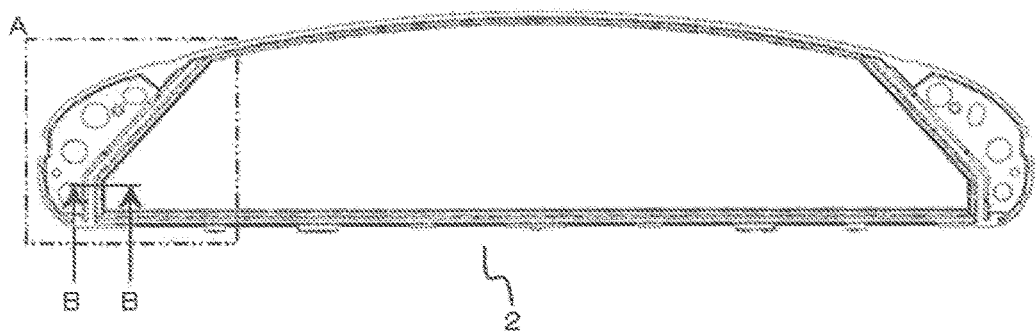
FIG. 3 is a plan view of the backlight included in the display according to the present invention.
Figure 4:
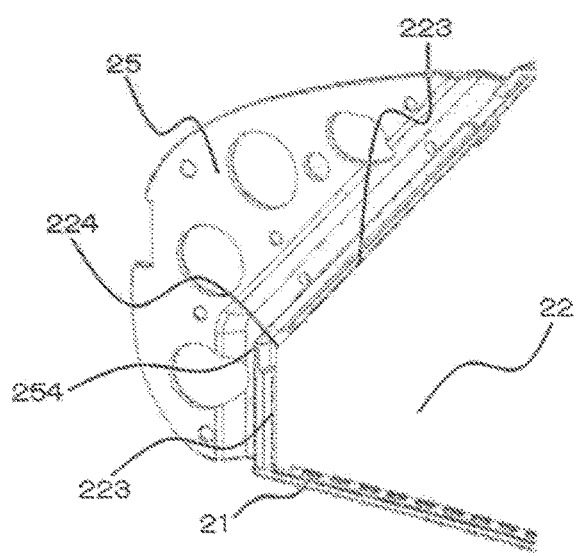
FIG. 4 is an enlarged view of an area A of the backlight in FIG. 3.
Figure 5:
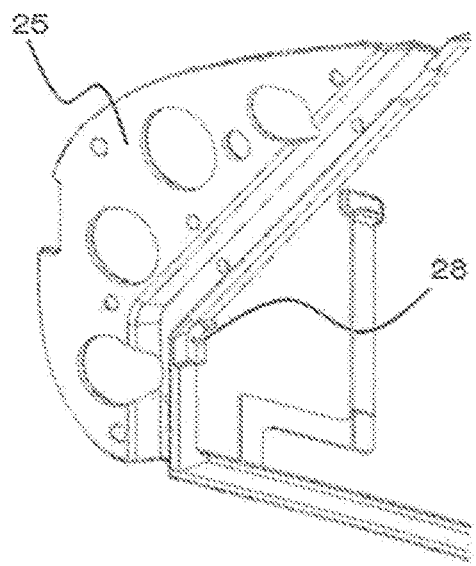
FIG. 5 is an enlarged view of the area A of the backlight in FIG. 3.
Figure 6:
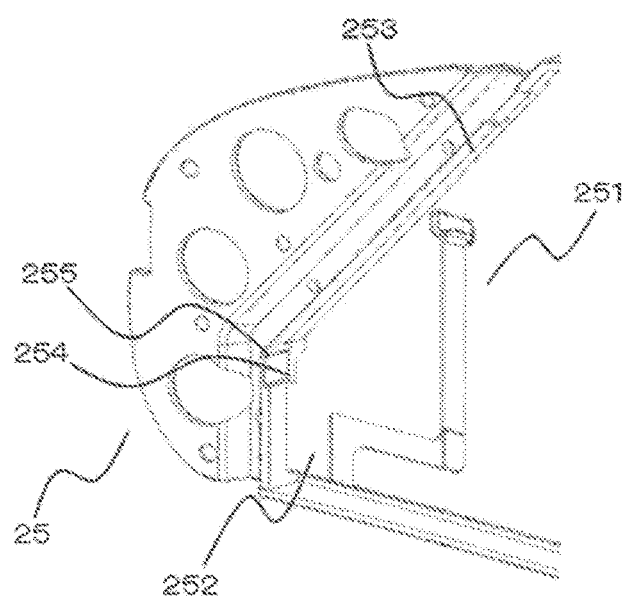
FIG. 6 is an enlarged view of the area A of the backlight in FIG. 3.
Figure 7:
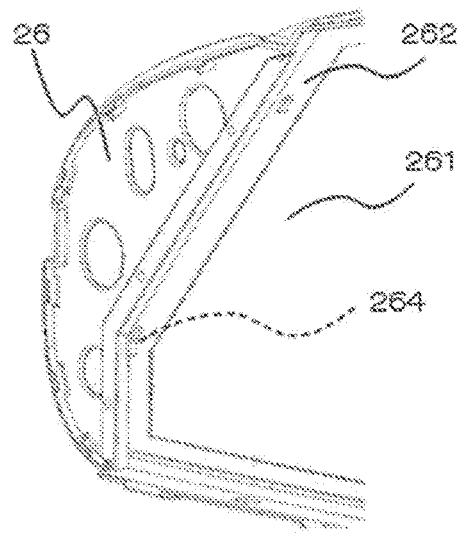
FIG. 7 is an enlarged view of the area A of the backlight in FIG. 3.
Figure 8:
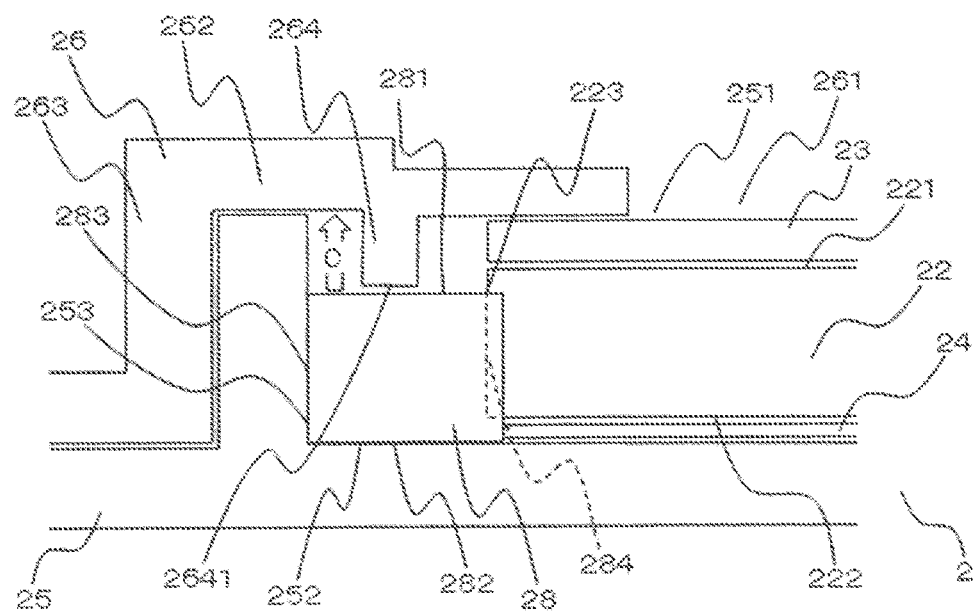
FIG. 8 illustrates a cross section taken along a line B-B of the backlight in FIG. 3.

Next, characteristic structures of the present invention will be described in detail. FIG. 3 is a plan view of the backlight 2 according to the present invention. FIG. 4 is an enlarged view of an area A of FIG. 3. FIG. 5 is an enlarged view of the area A of FIG. 3, and illustrates that a cushion rubber 28 is disposed on the lower frame 25. FIG. 6 is an enlarged view of the area A of FIG. 3, and illustrates the lower frame 25 included in the backlight 2. FIG. 7 is an enlarged view of the area A of FIG. 3, and illustrates the upper frame 26. FIG. 8 illustrates a cross section taken along a line B-B of FIG. 3.

As illustrated in FIGS. 6 and 8, the lower frame 25 included in the backlight 2 according to the present invention includes at least an opening portion 251 facing a bottom surface portion 252, and a side surface portion 253 formed continuous from the bottom surface portion 252. The lower frame 25 holds optical components inside with the approximate box shape.

As illustrated in FIGS. 7 and 8, the upper frame 26 includes an opening portion 261, an upper surface portion 262 at least forming the opening portion 261, and a side surface portion 263 formed continuous from the upper surface portion 262. The side surface portion 253 of the lower frame 25 is disposed face-to-face with and engaged in the side surface portion 263 of the upper frame 26 to sandwich the optical components.

As illustrated in FIG. 5, the cushion rubber 28 is disposed inside the lower frame 25 in the backlight 2 according to the present invention. The cushion rubber 28 is an elastic component. The material of the cushion rubber 28 is not particularly limited to, for example, rubber, silicone, and a foam as long as the cushion rubber 28 is made of a material with elasticity (a cushion). As illustrated in FIG. 8, the cushion rubber 28 is disposed between the side surface 223 of the light guide plate 22 and the side surface portion 253 of the lower frame 25 to face the side surface 223 of the light guide plate 22 and the side surface portion 253 of the lower frame 25.

As illustrated in FIGS. 4 and 8, the light guide plate 22 includes a corner portion 224 formed along the continuous side surface 223. The cushion rubber 28 includes an upper surface portion 281, a bottom surface portion 282, a side surface portion 283 disposed face-to-face with the side surface portion 253 of the lower frame 25, and a side surface portion 284 disposed face-to-face with the side surface 223 of the light guide plate 22. The cushion rubber 28 is formed to fit the side surface 223 forming the corner portion 224 of the light guide plate 22. The cushion rubber 28 is disposed lower than the side surface 223 of the light guide plate 22 in a cross-sectional view, and is of height not interfering with the optical sheets 23. Since the corner portion 224 of the light guide plate 22 is dog-legged in a plan view according to Embodiment 1, the cushion rubber 28 is dog-leg shaped in a plan view. When the light guide plate 22 is rectangular, the corner portion 224 is L-shaped in a plan view, and thus, the cushion rubber 28 is L-shaped. The cushion rubber 28 is appropriately shaped, in a plan view, to fit the corner portion 224 of the light guide plate 22.

As illustrated in FIG. 8, when the light guide plate 22 is disposed in the backlight 2 according to the present invention, the cushion rubber 28 abuts the side surface 223 of the light guide plate 22 and the side surface portion 253 of the lower frame 25 to be pressed (squeezed) into the light guide plate 22 and the lower frame 25. The amount of pressing the cushion rubber 28 is preferably set, for example, when the light guide plate 22 extends 1 mm toward the side surface 223 under a high temperature environment, to approximately ⅓ (approximately 0.3 mm) of an amount of elongation of the light guide plate 22 under a general environment (25° C.).

In a cross-sectional view of FIG. 8, the cushion rubber 28 is disposed lower than the side surface 223 of the light guide plate 22, and is formed at a height not interfering with the optical sheets 23. A protrusion portion 264 is formed in a space between the upper surface portion 281 of the cushion rubber 28 and the upper frame 26 from the upper surface portion 262 of the upper frame 26 to face the upper surface portion 281 of the cushion rubber 28.

The protrusion portion 264 is a protrusion portion protruding from the upper frame 26 toward a direction in which the cushion rubber 28 is disposed. The protrusion portion 264 is formed on the upper surface portion 262 of the upper frame 26 to partly protrude toward the upper surface portion 281 of the cushion rubber 28. Thus, a space is maintained around the protrusion portion 264. The height of the protrusion portion 264 of the upper frame 26 or the height of the upper surface portion 281 of the cushion rubber 28 (a thickness of the cushion rubber 28) is set so that a clearance created between a tip portion 2641 of the protrusion portion 264 and the upper surface portion 281 of the cushion rubber 28 is approximately 0.2 mm under the general environment (25° C. environment).

Advantages of the present invention will be described with reference to FIG. 8. Under a use environment with the vibrations or the temperature variation given, the cushion rubber 28 may move in a direction C (directed toward the upper surface portion 262 of the upper frame 26) if the cushion rubber 28 is subject to compressive stress and tensile stress through repeated movement or expansion and contraction of the optical components included in the backlight 2 such as the light guide plate 22 and the optical sheets 23. As described above, if the compressive stress is always applied to the cushion rubber 28 to press the light guide plate 22 under the use environment with the vibrations or the temperature variation given, the light guide plate 22 may be deformed. Moreover, the moving cushion rubber 28 may interfere with the other optical components to cause deformation or movement of the other optical components. In other words, the cushion rubber 28 may move in the direction C, interfere with the optical sheets 23, and cause display anomalies on the display due to occurrence of wrinkles on the optical sheets 23.

When the light guide plate 22 is disposed in the backlight 2 according to the present invention, the cushion rubber 28 abuts the side surface 223 of the light guide plate 22 and the side surface portion 253 of the lower frame 25 to be pressed (squeezed) into the light guide plate 22 and the lower frame 25. The cushion rubber 28 is disposed lower than the side surface 223 of the light guide plate 22, and is formed at a height not interfering with the optical sheets 23. The protrusion portion 264 is formed in a space between the upper surface portion 281 of the cushion rubber 28 and the upper frame 26 from the upper surface portion 262 of the upper frame 26 to face the upper surface portion 281 of the cushion rubber 28. The protrusion portion 264 of the upper frame 26 has a clearance between the tip portion 2641 of the protrusion portion 264 and the upper surface portion 281 of the cushion rubber 28 under the general environment (25° C. environment).

Thus, the display according to the present invention under a use environment with the vibrations or the temperature variation given prevents the light guide plate 22 from being pressed and deformed even when the compressive stress is applied to the cushion rubber 28. Thus, the display can prevent display anomalies.

Since the protrusion portion 264 can prevent the cushion rubber 28 disposed lower than the optical sheets 23 from moving, the cushion rubber 28 can prevent interference with the other optical components such as the optical sheets 23, displacements of the optical sheets 23, and occurrence of the wrinkles or slacks on the optical sheets 23. Thus, the display can reduce display anomalies.

The cushion rubber 28 arranged in each of the corner portions (224, 254) of the light guide plate 22 and the lower frame 25 can restrain the movement of the light guide plate 22 in two adjacent directions forming the corner portion.

Disposing the cushion rubber 28 in a direction for pressing the light guide plate 22 with respect to the arrangement direction of the light source 21 can position the cushion rubber 28 with respect to the light source 21.

Figure 9:
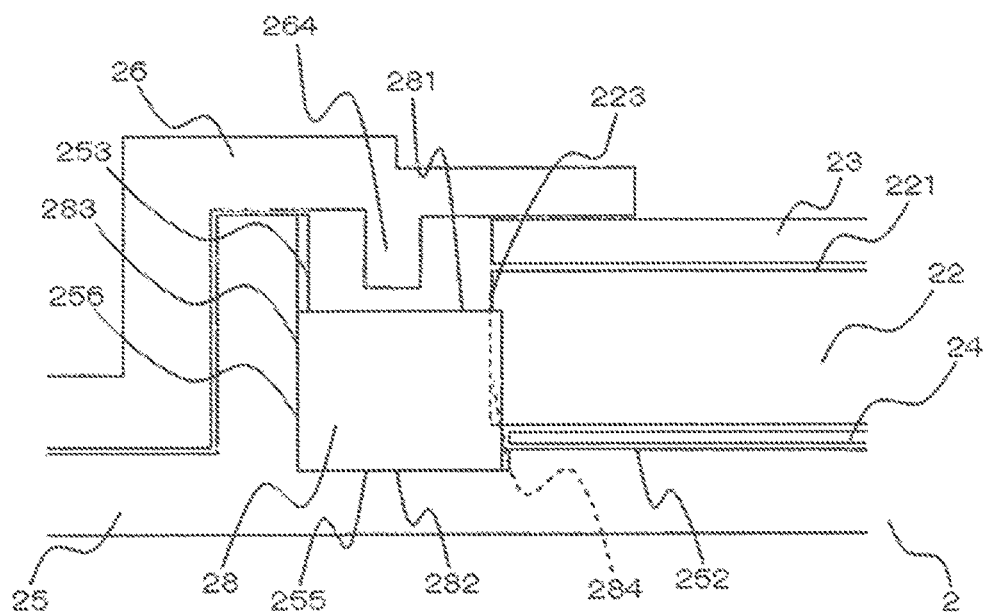
FIG. 9 illustrates a modification of the backlight according to Embodiment 1 of the present invention.

FIG. 9 is a cross section of a modification of the backlight 2 according to Embodiment 1 of the present invention. As illustrated in FIG. 9, a recess portion to fit the cushion rubber 28 may be formed in a position of the lower frame 25 at which the cushion rubber 28 is to be disposed. Forming a recess portion 255 at the bottom surface portion 252 of the lower frame 25 facilitates positioning of the bottom surface portion 282 of the cushion rubber 28. Further forming a recess portion 256 at the side surface portion 253 of the lower frame 25 facing the cushion rubber 28 to fit the cushion rubber 28 facilitates positioning of the cushion rubber 28. This structure improves the engageability.

Although Embodiment 1 describes only the left side of FIG. 3, the right side facing the left side also has the same structure if the backlight 2 is symmetrically formed. Although the light guide plate 22 is depicted as being non-rectangular and curved in the drawings, Embodiment 1 is also applicable to a display including a backlight including a rectangular or planar light guide plate. Although the protrusion portion 264 is integrally formed with the upper surface portion 262 of the upper frame 26, the protrusion portion 264 and the upper surface portion 262 may be separately formed.

Embodiment 2

Figure 10:
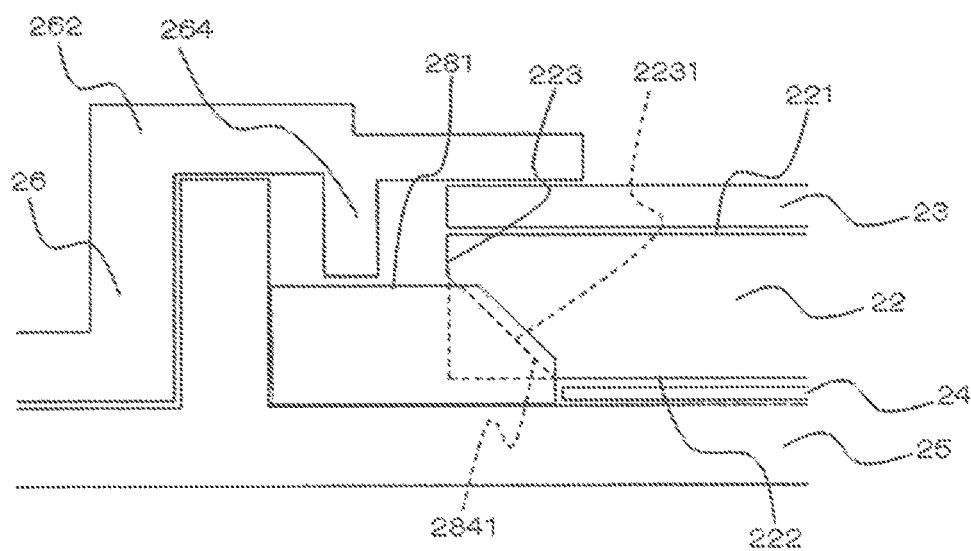
FIG. 10 is a cross section of a backlight according to Embodiment 2 of the present invention.

FIG. 10 is a cross section of the backlight 2 according to Embodiment 2 of the present invention. Although the side surface 223 of the light guide plate 22 and the side surface portion 284 of the cushion rubber 28 that faces the side surface 223 abut each other and lie in an approximately vertical plane with respect to the light emitting surface 221 in the structure of Embodiment 1, the side surface 223 of the light guide plate 22 and the side surface portion 284 of the cushion rubber 28 that faces the side surface 223 have respective sloped surfaces in Embodiment 2. As illustrated in FIG. 10, a sloped surface 2231 is formed on the side surface 223 of the light guide plate 22 that faces the cushion rubber 28. Similarly, a sloped surface 2841 is formed on the side surface portion 284 of the cushion rubber 28 that faces the light guide plate 22. When the cushion rubber 28 and the light guide plate 22 are compressively arranged according to the structure of Embodiment 2, the respective side surface portions of the cushion rubber 28 and the light guide plate 22 can be slidingly arranged, which improves the assembly workability as well as facilitating the positioning. Although FIG. 10 illustrates that the sloped surface 2231 of the light guide plate 22 is sloped from the light emitting surface 221 side toward the opposite light emitting surface 222 side of the light guide plate 22, the sloped surface 2231 may be sloped from the opposite light emitting surface 222 side toward the light emitting surface 221 side. This structure reliably enables the light guide plate 22 to be disposed compressively.

Embodiment 3

Figure 11:
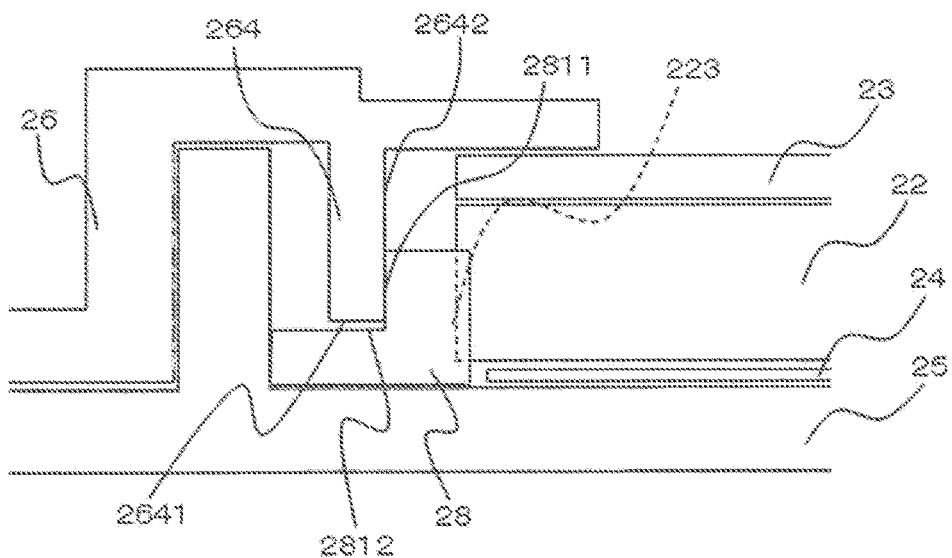
FIG. 11 is a cross section of a backlight according to Embodiment 3 of the present invention.

FIG. 11 is a cross section of the backlight 2 according to Embodiment 3 of the present invention. Although the side surface 223 of the light guide plate 22 and the side surface portion 284 of the cushion rubber 28 that faces the side surface 223 abut each other and the upper surface portion 281 of the cushion rubber 28 is disposed face-to-face with the protrusion portion 264 formed on the upper frame 26 in the backlight 2 according to Embodiment 1, a step is formed in the cushion rubber 28 to fit the tip portion 2641 and a side surface portion 2642 of the protrusion portion 264 according to Embodiment 3. As illustrated in FIG. 11, a side surface 2811 forming the step of the cushion rubber 28 is formed to fit the side surface portion 2642 of the protrusion portion 264 of the upper frame 26. A planar portion 2812 is formed in the cushion rubber 28 to face the tip portion 2641 of the protrusion portion 264. Since forming the step (the side surface portion 2811 and the planar portion 2812) of the cushion rubber 28 to face the protrusion portion 264 allows the abutting arrangement of the side surface portion 2642 of the protrusion portion 264 and the side surface portion 2811 of the cushion rubber 28, the protrusion portion 264 and the cushion rubber 28 can be easily positioned.

Embodiment 4

Figure 12:
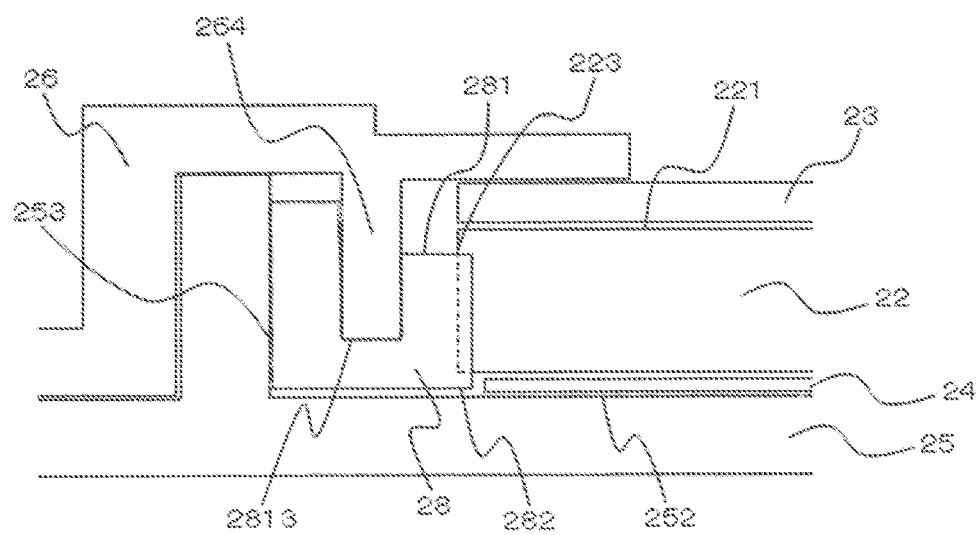
FIG. 12 is a cross section of a backlight according to Embodiment 4 of the present invention.

FIG. 12 is a cross section of the backlight 2 according to Embodiment 4 of the present invention. In a structure according to Embodiment 4, a recess portion 2813 corresponding to the protrusion portion 264 of the upper frame 26 is formed in the cushion rubber 28, and fits the protrusion portion 264. The backlight 2 according to Embodiment 4 has a clearance between the bottom surface portion 282 of the cushion rubber 28 and the bottom surface portion 252 of the lower frame 25. Since the structure according to Embodiment 4 enables the assembly of the backlight 2 with the cushion rubber 28 engaged in the protrusion portion 264 of the upper frame 26, processes for disposing the cushion rubber 28 on the lower frame 25 are reduced while an assembly operation of the cushion rubber 28 is facilitated. Forming, in a cross-sectional view, a portion of the upper surface portion 281 of the cushion rubber 28 formed in the vicinity of the side surface portion 253 of the lower frame 25 higher than a portion of the upper surface portion 281 of the cushion rubber 28 formed in the vicinity of the side surface 223 of the light guide plate 22 can facilitate the positioning of the cushion rubber 28 with respect to the protrusion portion 264, and reliably engage the protrusion portion 264 in the cushion rubber 28 through increase in a contact area between the protrusion portion 264 and the recess portion 2813.

Embodiments of the present invention are not limited to the structures above but can be variously changed and combined without departing from the scope of the present invention. The types or locations of the light source and the light guide plate can be appropriately selected.

While the invention has been shown and described in detail, the foregoing description is in all aspects illustrative and not restrictive. It is therefore understood that numerous modifications and variations can be devised without departing from the scope of the invention.

What is claimed is:
1. A backlight, comprising:
a light source;
a light guide plate having a side surface connecting a light emitting surface to an opposite light emitting surface opposite to said light emitting surface, said light guide plate emitting, from said light emitting surface, light from said light source;
an optical sheet arranged on said light emitting surface of said light guide plate;
a lower frame having a bottom surface portion and a side surface portion continuous from said bottom surface portion, said lower frame holding said light source and said light guide plate inside;

an upper frame having an upper surface portion having a portion opposing said light emitting surface of said light guide plate, and a side surface portion continuous from said upper surface portion, said upper frame being engaged in said lower frame; and an elastic component that is a separate element from the lower frame, directly contacts to said light guide plate, and is disposed between said side surface of said light guide plate and said side surface portion of said lower frame or said upper frame, wherein said elastic component is disposed lower than said optical sheet in a cross-sectional view, and a protrusion portion is formed in a space between said upper surface portion of said upper frame and said elastic component, said protrusion portion protruding from said upper frame toward a direction in which said elastic component is disposed.

2. The backlight according to claim 1, wherein said protrusion portion includes a tip portion facing said elastic component, and has a predetermined clearance between said tip portion and said elastic component facing said tip portion.

3. The backlight according to claim 1, wherein said elastic component is disposed at a corner portion formed along said side surface of said light guide plate, said side surface being continuous.

4. The backlight according to claim 1, wherein said lower frame includes a recess portion at said bottom surface portion on which said elastic component is disposed, said recess portion fitting said elastic component.

5. The backlight according to claim 1, wherein said lower frame includes a recess portion at said side surface portion on which said elastic component is disposed, said recess portion fitting said elastic component.

6. The backlight according to claim 1, wherein said side surface of said light guide plate and a side surface portion of said elastic component disposed face-to-face with said side surface of said light guide plate have respective sloped surfaces with respect to said light emitting surface of said light guide plate.

7. The backlight according to claim 1, wherein said elastic component includes a step facing said protrusion portion.

8. The backlight according to claim 1, wherein said elastic component includes a recess portion facing said protrusion portion, said recess portion being engaged in said protrusion portion.

9. The backlight according to claim 1, wherein said protrusion portion is integrally formed with said upper surface portion of said upper frame.

10. A display, comprising
a display panel disposed to face said backlight according to claim 1, said display panel displaying an image.

* * * * *